United States Patent [19]

Pierce

[11] Patent Number: 4,955,063
[45] Date of Patent: Sep. 4, 1990

[54] VECTOR DISPLAY APPARATUS

[75] Inventor: Gerald A. Pierce, Redwood City, Calif.

[73] Assignee: Nippon Sheet Glass Co., Ltd., Osaka, Japan

[21] Appl. No.: 332,420

[22] Filed: Mar. 30, 1989

Related U.S. Application Data

[63] Continuation of Ser. No. 38,638, Apr. 14, 1987, abandoned.

[51] Int. Cl.$^5$ .............................................. G06K 9/46
[52] U.S. Cl. .................................... 382/18; 340/754; 382/32
[58] Field of Search ................ 382/14, 18, 32, 25, 382/65, 42, 51; 340/705, 715, 753, 754

[56] References Cited

U.S. PATENT DOCUMENTS

| | | | |
|---|---|---|---|
| 3,252,140 | 5/1966 | Lemay et al. | 382/32 |
| 3,550,119 | 12/1970 | Rabinow | 382/32 |
| 3,696,393 | 10/1972 | McDonald | 340/754 |
| 4,286,146 | 8/1981 | Uno et al. | 382/65 |
| 4,441,205 | 3/1984 | Berkin et al. | 382/14 |
| 4,490,851 | 12/1984 | Gerhart et al. | 382/18 |
| 4,669,054 | 5/1987 | Schlunt et al. | 382/42 |
| 4,742,556 | 5/1988 | Davis, Jr. et al. | 382/18 |
| 4,807,163 | 2/1989 | Gibbons | 382/18 |

Primary Examiner—Leo H. Boudreau
Attorney, Agent, or Firm—Woodcock Washburn Kurtz Mackiewicz & Norris

[57] ABSTRACT

A vector display apparatus includes a display panel as a display screen for a vector subjected to discrimination. The display panel comprises display elements arranged in a matrix form. The display elements at positions corresponding to an input vector signal are selectively turned on to display an optical pattern corresponding to magnitudes of the vector components without displaying numerical values.

7 Claims, 3 Drawing Sheets

VECTOR DISPLAY APPARATUS

This is a continuation of application Ser. No. 07/038,630, filed Apr. 14, 1987 now abandoned.

BACKGROUND OF THE INVENTION

I. Field of the Invention

The present invention relates to a vector display apparatus for displaying a vector which represents a feature or features of information to be processed such as an image (e.g., a character or any other figure), various kinds of speech inputs, and technical information to be retrieved.

II. Description of the Prior Art

In order to discriminate information such as an image (e.g., a character and any other figure), various kinds of speech inputs, and technical information to be retrieved, there is known a method of discriminating the information as a vector comprising a single component or a plurality of components.

For example, when the information is an image, the image pattern which has been formed by printing or the like and is subjected to image recognition is mapped by an optical lens on the light-receiving surface of an image sensor comprising a CCD or a MOS sensor. A multi-value digital signal as image information is output from the image sensor and is binarized with a proper threshold value (if a plurality of threshold values are used, a multi-value conversion different from that described above is performed). The binarized signal is stored in a memory. As occasion demands, the binarized image information is subjected to preprocessing for shaping the image before being stored in the above or another memory. The preprocessing includes noise reduction and normalization for position, size, inclination and width.

A feature extraction from the image information stored in the memory is taken place in a projection-processing section.

In order to project an image on a given axis (e.g., the X-axis), the memory which stores the image information is scanned in a direction (e.g., the Y-axis) having a predetermined relationship with the given axis, and the image information is read out serially or parallelly in time. The readout image information is transferred to the projection-processing section, in which pieces of the transferred image information are sequentially accumulated. Accumulated values sequentially obtained by such accumulations are stored at predetermined positions corresponding to the given axis in the above or still another memory.

In order to digitally process the projection features described above, the accumulated values as input data are regarded as a component of vector. One or a plurality of intensity distributions is dealt as a vector having a large number of components. Therefore, if the accumulated values for an intensity distribution are stored at addresses 1 to n, this intensity distribution constitutes an n-dimensional vector.

In this case, in order to increase the image recognition rate, projection processing must be performed for the same image information on a large number of axes to extract different types of features. Therefore, an image to be recognized is dealt as a set of a large number of multi-dimensional vectors.

Each of the multi-dimensional vectors is represented such that a pair of values represent the order and the magnitude of the vector. The pair of order and magnitude are digitally processed in units of bytes. In digital processing, intermediates states represented by vector components need not be displayed.

In order to discriminate an optical pattern displayed, an image reading apparatus utilizing an optical technique (OCR processing) has been used in practice. In such an image reading apparatus, features of the optical pattern displayed are extracted by projections, and the projection features extracted are compared with those of reference patterns for classification. The image classified in such a manner is correlated with a large number of images belonging to the given class by correlation calculations to specify the image, i.e., to recognize the image. In the correlation calculations, the projection features of the input image to be recognized are compared with those of a large number of image recognition reference patterns, which are ordered according to the degree of similarity of each of them to the input image so as to specify the latter according to the above ordering.

In conventional vector calculation techniques, since only digital techniques are used, intermediate results need not be displayed to the outside of calculators. The present invention is made to provide an optical input device for a processing unit compatible with optical processing rather than digital processing.

In general, the magnitude of a vector is numerically displayed by a combination of values representing vector components and values each representing the intensity of the vector component. When these values are directly given on a display for an input device of an optically processing unit, numerical values to be input must be appreciated for optical processing. As a result, the reading unit in such a processing unit becomes complicated and bulky.

In addition, when vector components are numerically given on a display, a large number of vector components cannot be displayed at the same time.

SUMMARY OF THE INVENTION

It is an object of the present invention to provide a vector display apparatus in which a vector to be discriminated is displayed not numerically but as an optical pattern to facilitate the reading.

It is another object of the present invention to provide a vector display apparatus in which the number of kinds of vector information displayed per unit display area becomes large to be able to display various kinds of vector information at the same time.

It is still another object of the present invention to provide a high-speed and bright vector display apparatus.

It is a fourth object of the present invention to provide a vector display apparatus suitable for use together with a vector discrimination apparatus to decrease the cose of the vector discrimination system by simplifying the reading apparatus.

The above and other objects are attained by the invention as follows.

In the present invention, a vector display apparatus comprises a two-dimensional display panel provided with light-emitting elements arranged in a matrix form, and driving means for selectively driving the light-emitting elements so as to turn on ones of the light-emitting elements located at positions corresponding to magnitudes of vector components of a vector subjected to discrimination in response to an input vector signal.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENT

Figure 1:
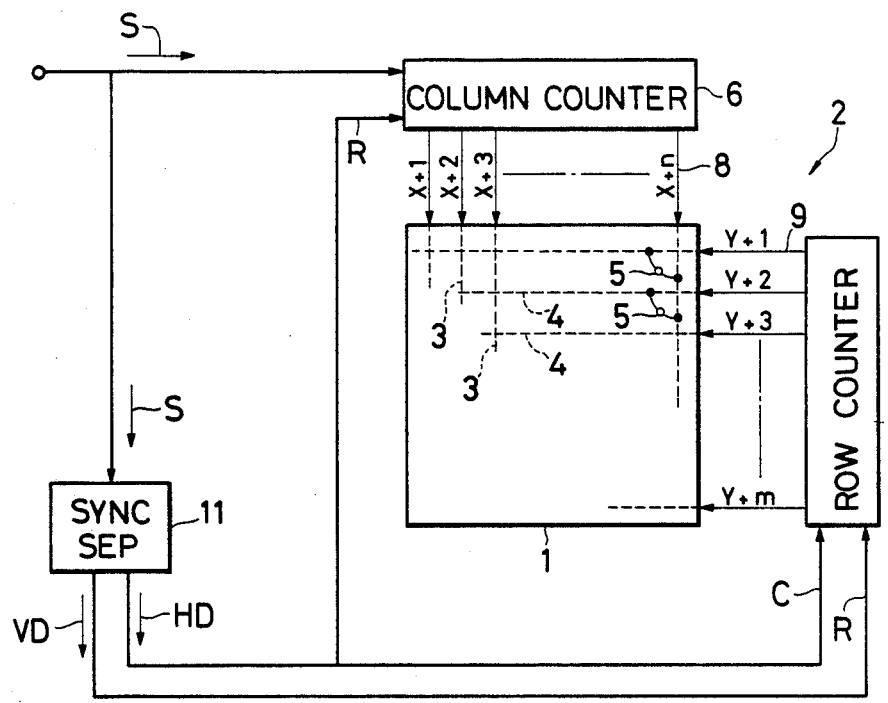
FIG. 1 is a block diagram showing a vector display apparatus according to an embodiment of the present invention.

Referring first to FIG. 1, a vector display apparatus comprises a display panel 1 and a driving means 2. A plurality of X-axis electrodes 3 (column electrodes) and a plurality of Y-axis electrodes 4 (row electrodes) are formed on the display panel 1. Light-emitting elements 5 as display elements for an image are arranged at intersections of the electrodes 3 and 4, respectively. In this embodiment, the light-emitting elements 5 comprise light-emitting diodes (LEDs) 5, respectively. More specifically, the light-emitting diodes 5 are arranged in a matrix form. In this embodiment, the LEDs are arranged in 100 columns and 100 rows. Vector elements are displayed along the X-axis, and intensities of the vector elements are displayed along the Y-axis. With this arrangement, 100 vector elements can be displayed. At the same time, the intensity level of each vector element can be displayed in 100 steps.

The driving means 2 for driving the display panel 1 includes a column counter 6 for driving the column electrodes and a row counter 7 for driving the row electrodes. The column counter 6 is arranged as a column driving unit for supplying a data signal to each X-axis electrode 3. The row counter 7 is arranged as a row drive unit for supplying a line signal 9 to each Y-axis electrode 4.

A horizontal sync pulse HD extracted from an input vector signal S by a sync separator 11 is supplied as a reset signal R to the column counter 6. At the same time, the horizontal sync pulse HD is supplied as a clock signal C to the row counter 7. A vertical sync pulse VD is extracted by the sync separator 11. The vertical sync pulse VD is supplied as a reset signal R to the row counter 7. The column counter 6 is reset for every H period whenever the display panel 1 is raster-scanned. Data signals 8 are generated for every row scanning. The row counter 7 is reset in response to a vertical sync pulse VD to sequentially select the rows. All dots $(X_1,Y_j)$, $(X_2,Y_j)$, $(X_3,Y_j)$, ... $(X_n,Y_j)$ on the $Y_j$th row are simultaneously accessed. When all the dots on the $Y_j$th row are accessed, access is shifted to the $Y_{(j+1)}$th row. In this manner, line sequential scanning is performed.

The scanning method may be replaced with dot sequential scanning or the like.

Figure 2:
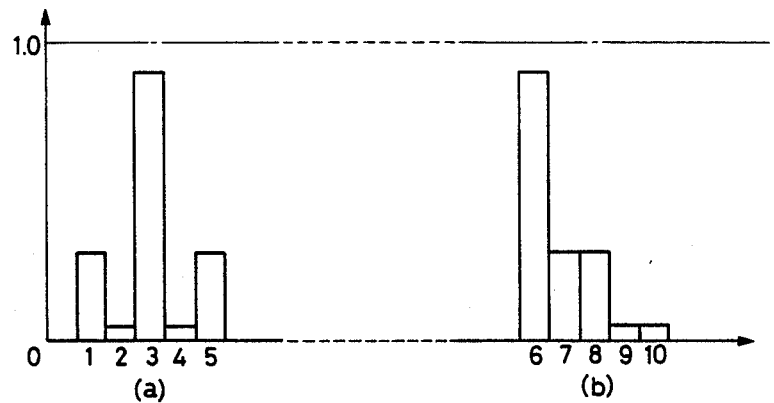
FIG. 2 is a graph showing an intensity distribution of vector components derived from projections on the X- and Y-axes, respectively.

A vector signal S is a digital signal obtained by an optical method of converting a vector consisting of vector components corresponding to features such as projection features extracted from an image subjected to recognition. In this embodiment, the (X+1)th, (X+2)th, (X+3)th, ... (X+n)th data signals 8 represent the orders of vector elements, respectively. The (Y+1)th, (Y+2)th, (Y+3)th, ... (Y+m)th line signals 9 represent the intensities of the vector components, respectively. FIG. 2 shows an X-axis projection intensity distribution (a) and a Y-axis projection intensity distribution (b), both of which are obtained by extracting the features from a Chinese character "山". In this case, the vector correspondiing to the projection features of the Chinese character "山" consists of five vector components 1 to 5 corresponding to the X-axis projection data and five vector components 6 to 10 corresponding to the Y-axis projection data. These ten vector components are displayed as a light spot pattern on the display panel 1.

Figure 3:
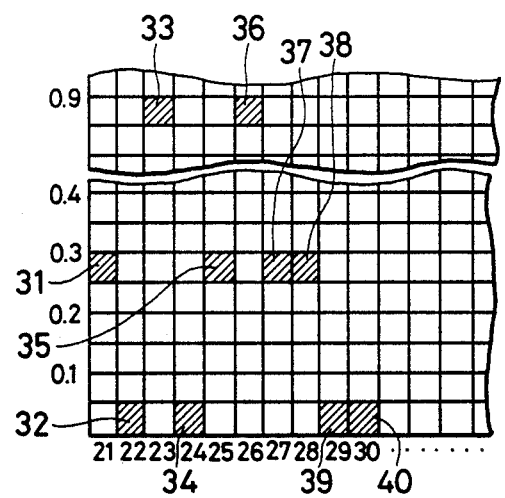
FIG. 3 is a partial front view of a display panel showing a light spot pattern representing a Chinese character "山"

Peaks of the intensity distributions (a) and (b) in FIG. 2, which are obtained by X- and Y-axis projection, are displayed as a large number of light spots on the display panel 1 of FIG. 1. FIG. 3 shows a state that the projection data 1 to 10 of the Chinese character "山" shown in FIG. 2 are displayed on the display panel 1. The projection data 1 to 10 are transformed into a 10-dimensional vector. The relative intensities, i.e., rating values, of the vector components 1 to 10 are shown in the following table. The intensities of the vector components 1 to 10 are displayed as light spots 31 to 40 at positions corresponding to the rating values thereof in areas 21 to 30 corresponding to the vector components 1 to 10 on the display panel 1.

| Projection Data No. | Rating Value of Vector Component |
|---|---|
| 1 | 0.3 |
| 2 | 0.05 |
| 3 | 0.9 |
| 4 | 0.05 |
| 5 | 0.3 |
| 6 | 0.9 |
| 7 | 0.3 |
| 8 | 0.3 |
| 9 | 0.05 |
| 10 | 0.05 |

In the vector display apparatus of this embodiment, the vector components are displayed as light spots, and thus a large number of values can be simultaneously displayed on the display panel 1. Therefore, when optical patterns displayed are to be processed according to optical techniques, various kinds of information can be simultaneously processed.

Figure 4:
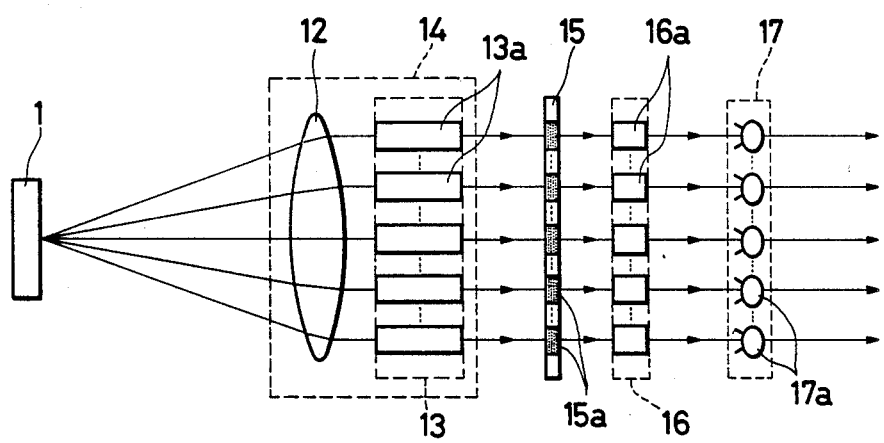
FIG. 4 is a schematic diagram of a vector discrimination system using a vector display apparatus of the present invention.

FIG. 4 is a block diagram of a vector discrimination system for discriminating an optical pattern formed on the vector display apparatus.

A projection lens 12 is spaced apart from the front surface of the display panel 1 of the vector display apparatus by the focal length of the projection lens 12. Beams from the light spots 31 to 40 on the display panel 1 are collimated by the projection lens 12. The beams collimated are transmitted to a mask array 15 through a first lens array 13.

The mask array 15 comprises a large number of reference masks 15a substantially located on a single plane. The first lens array 13 comprises image formation lenses 13a at positions respectively corresponding to the reference masks 15a. The first lens array 13 may comprise a planar microlens obtained by locating the same number of microlenses (e.g., gradient index lenses) as that of the reference masks 15a in a flat plate made of glass or a synthetic resin. Alternatively, the lens array 13 may comprises an SLA (tradename) available from Nippon Sheet Glass Co., Ltd. The SLA is obtained by bundling cylindrical gradient index lenses, the number of which is the same as that of the reference masks 15a. When the SLA is used, a resin is filled between the cylindrical gradient index lenses such that they are located at positions corresponding to the image formation lenses 13a.

The projection lens 12 and the lens array 13 constitute a multiplier 14. The pattern of the light spots 31 to 41 displayed on the display panel 1 and transmitted on the first lens array 13 through the projection lens 12 is imaged equivalently on each of the reference masks 15a of the mask array 15 by each image formation lens 13a of the lens array 13 at the same time.

Various kinds of reference masks, the number of which is required for discrimination operations such as classification and recognition, are used as the reference masks 15a. One of the reference masks 15a shown in FIG. 4 has a reference pattern corresponding to the pattern of the light spots 31 to 40 of the Chinese character "山" shown in FIG. 3 and is thus available to recognize the Chinese character "山".

The patterns each corresponding to the pattern of the light spots 31 to 40 displayed on the display panel 1 are formed on different types of reference masks 15a by the multiplier 14, respectively. In this case, each image formation is performed such that the one-to-one correspondence between the areas 21 to 30 of the display panel 1 and the areas of each reference mask 15a is established. The beams passing through the reference masks 15a are focused by a large number of condenser lens 16a of a second lens array 16, which are located in one-to-one correspondence with the reference masks 15a. The beams focused are then transmitted onto a photosensor array 17. The second lens array 16 may be a planar microlens or an SLA having the same arrangement as that of the first lens array 13.

The photosensor array 17 comprises a large number of photosensors 17a arranged in one-to-one correspondence with the Condenser lenses 16a and located near the focal points of the latter. The beams passing through the reference masks 15a are focused by the condenser lenses 16a, and the intensities of these beams are detected by the photosensors 17a, respectively. In this case, the nearer the intensity of the beam detected by the photosensor 17a in relation to a reference mask 15a is to a predetermined rating intensity, the better the reference mask 15a matches with the pattern of the light spots 31 to 40 of the image to be discriminated.

Outputs from the photosensors 17a are rated at every reference mask 15a according to the maximum intensity of the beam passing through the reference mask 15a in order to make image discrimination easy. The levels of the outputs rated are compared with each other in a maximum value detector (not shown), and the reference mask 15a giving the maximum output is discriminated. By this discrimination result, classification or recognition of the image to be discriminated is performed. A peak detector may be additionally arranged in the maximum value detector, and only sensor output levels exceeding a threshold value of the peak detector may be compared to reduce the number of sensor outputs to be compared.

In the vector discrimination apparatus having the above arrangement, after a pattern of light spots representing projection data as vector components are displayed on the display panel 1, the multiplication of the pattern, the optical matching between the patterns multiplied and the reference patterns of the different types of reference masks 15a, and focusing of beams passing through the reference masks 15a by means of the condenser lenses 16a can be performed at the light propagation speed. The beams focused can be simultaneously detected by the large number of photosensors 17a in a short response time. Therefore, the pattern matching between the light spot pattern (i.e., unknown pattern) representing the features of the image to be discriminated and the reference patterns (i.e., unknown patterns) of the reference masks allows simultaneous and high-speed correlation calculations.

In the vector display apparatus of this embodiment, vector components and their intensities are displayed with light spots by arranging light-emitting diodes 5 in a matrix form. Therefore, numeric reading means in a vector discrimination system for optionally processing an optical pattern displayed on the display panel 1 can be simplified. For example, without using such reference masks 15a as shown in FIG. 4, numeric reading means can be constituted by a simple light-receiving element array.

In the above embodiment, the number of vector components is 5×2. However, in general, the number of vector components may be n×m (where each of n and m is an integer of 1 or more). In this case, n×m light spots are arranged on the display panel 1, so that a light spot pattern consists of a set of m n-dimensional vectors.

Figure 5:
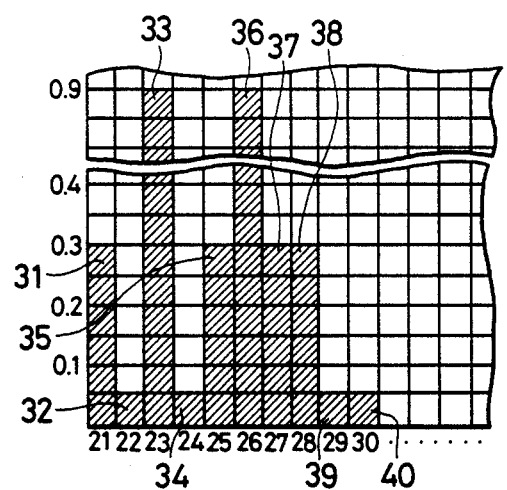
FIG. 5 is a partial front view of a display panel showing a pattern different from that in FIG. 3.

In this embodiment, only the light-emitting diodes located in correspondence of the peaks of the intensities of vector components are turned on to form light spots. However, as shown in FIG. 5, all light-emitting diodes up to the peak of the intensity of each vector component may be turned on in line.

Other relatively simple optical patterns such as bright lines may be used in place of light spots displayed on the display panel 1.

Alternatively, vector components may be displayed along the Y-axis and the intensities of the vector components may be displayed along the X-axis.

In the above embodiment, images to be recognized include alphanumeric symbols (i.e., letters and Arabic numerals), Japanese hiragana characters, Japanese katakana characters, and Chinese characters. In this case, characters may be printed or handwritten characters of a Gothic type, a Ming type or the like. The present invention can also be applied to a display apparatus for various types of information which can be represented by vectors, such as figures excluding characters, various types of speech, and technical information to be retrieved.

As many apparently widely different embodiments of this invention may be made without departing from the spirit and scope thereof, it is to be understood that the invention is not limited to the specific embodiments thereof except as defined in the appended claims.

What is claimed is:

1. A vector display apparatus for displaying vectors as an optical pattern used in an image recognition system, each of said vectors having components which represent an intensity distribution of the projection obtained by projecting an image to be recognized onto an imaginary axis, said apparatus comprising:

a two-dimensional display panel including light-emitting elements arranged in a matrix form;

driving means for driving said light-emitting elements to turn on ones of said light-emitting elements located at positions corresponding to the magnitudes of the components of each of said vectors with an area assigned to the vector in said display panel.

2. An apparatus according to claim 1, wherein each of said light-emitting elements has a spot form.

3. An apparatus according to claim 1, wherein each of said light-emitting elements has a line form.

4. An apparatus according to claim 1, wherein each of said light-emitting elements comprises a light-emitting diode.

5. A vector display apparatus for displaying vectors as an optical pattern used in an image recognition system, each of said vectors having components which represent an intensity distribution of a projection obtained by projecting an image to be recognized onto an imaginary axis, said apparatus comprising:

a two-dimensional display panel wherein column electrodes and row electrodes are formed in a matrix form and light-emitting elements are arranged at intersections of said column electrodes and row electrodes;

a synchronizing signal separator which extracts a horizontal synchronizing signal and a vertical synchronizing signal from an input vector signal representing the vectors;

a column counter which receives said input vector signal and said horizontal synchronizing signal and supplied said input vector signal sequentially to said column electrodes until being reset by said horizontal synchronizing signal; and a row counter which receives said horizontal synchronizing signal and said vertical synchronizing signal and selects said row electrodes sequentially in synchronization with said horizontal synchronizing signal until being reset by said vertical synchronizing signal; and wherein ones of said light-emitting elements at intersections of said column electrodes to which said input vector signal is supplied by said column counter and said row electrodes which are selected by said row counter are turned on.

6. An apparatus according to claim 5, wherein only said light-emitting elements located in correspondence of peaks of the intensities of the components are turned on in spot.

7. An apparatus according to claim 5, wherein all said light-emitting elements up to a peak of the intensity of each component are turned on in line.

* * * * *